United States Patent
Krejcir

[15] 3,682,464
[45] Aug. 8, 1972

[54] PNEUMATIC SPRING

[72] Inventor: Oldrich Krejcir, Liberec, Czechoslovakia

[73] Assignee: Autobrzdy, narodni podnik, Jablonec nad Nisou, Czechoslovakia

[22] Filed: July 29, 1970

[21] Appl. No.: 59,141

[52] U.S. Cl. ................................... 267/65, 92/93
[51] Int. Cl. ........................................... F16f 3/00
[58] Field of Search ..92/93, 103; 267/65, 65 A, 65 B

[56] References Cited

UNITED STATES PATENTS

| | | | |
|---|---|---|---|
| 3,043,582 | 7/1962 | Hirtreiter | 267/65 B |
| 3,081,075 | 3/1963 | Selman | 267/65 A |
| 2,922,637 | 1/1960 | Bowser | 267/65 A |
| 3,438,309 | 4/1969 | Boileau | 267/65 X |
| 3,162,433 | 12/1964 | Smirl | 267/65 A |
| 2,999,681 | 9/1961 | Muller et al. | 267/65 A |
| 3,549,142 | 12/1970 | Tilton | 92/103 X |

FOREIGN PATENTS OR APPLICATIONS

| 156,184 | 9/1921 | Great Britain | 267/65 |
|---|---|---|---|

*Primary Examiner*—Martin P. Schwadron
*Assistant Examiner*—Leslie J. Payne
*Attorney*—Richard Low and Murray Schaffer

[57] ABSTRACT

A pneumatic spring comprising a tubular body, having a neck. A piston secured about the neck and movable within the body. Retaining means for securing the beaded ends of the body to supports and to the piston.

6 Claims, 3 Drawing Figures

INVENTOR
OLDRICH KREJCIR

PNEUMATIC SPRING

BACKGROUND OF THE INVENTION

The present invention relates to pneumatic suspension systems for automobiles and similar vehicles.

Pneumatic or air springs are formed of a flexible bag, diaphragm body, or a container of rubber or rubber-like material, usually reinforced with fabric or metallic cords. Such devices are particularly suitable for use as suspension systems for automobiles, omnibusses, trucks, and similar vehicles.

Generally, beads are provided of rubber or rubber-like material reinforced with hoops in a generally known manner, and fastened and sealed by the effect of air pressure inside the body of the pneumatic springs by being forced against a seat provided on the upper part of a piston or a support plate. It is also common in diaphragm-type air springs, particularly, to bend the lower edge of the bag or of the diaphragm over a rounded peak of a hollow piston and secure it by a plate tightly held by fasteners and vulcanized directly to the reinforced edges. In another known embodiment the beads are forced from beneath the piston against an end of a conical or a pot-like piece inserted into the piston of the pneumatic spring.

Although in all these cases the beads of the bag or the diaphragm have simple shapes, their production is exacting and costly. They all require that the inside of the mould in which the body bags or diaphragms are vulcanized in production be provided with a heating core, for moulding the beads, or at least other auxiliary parts. In addition, in all known bag-type or diaphragm-type pneumatic springs, the bag or diaphragm becomes deformed during spring action in the vicinity of the beads, and since the wall of the bag or of the diaphragm at that point is always of irregular thickness either because it extends continually or suddenly into the reinforced beads, or in some cases because of the accumulation and overflow of rubber from the beads during moulding and vulcanization, there is created by a sudden change of the shape and cross-section, harmful stresses which reduce the life of the device.

Another disadvantage occurs when the diameters of the two beads of the bag and of the diaphragm are substantially different. Here, the shape of the beads must be excessively changed during preparation of production of the bag or of the diaphragm and they must be either extended or narrowed. When this is done, the distribution of the cords, reinforcing the bag or the diaphragm, is irregular and the harmful effects resulting from sudden changes of the shape and of the cross-section are increased.

It is also known that hollow pistons may be used for increasing the volume of air in the pneumatic spring. However, if such hollow pistons are produced by moulding, they are sometimes porous, and then difficulties arise from leakage of air. This results in considerable losses in the production by an excessive number of rejects, and the costs are also increased by the necessity of a rigid and time consuming control.

Numerous vehicles presently use pneumatic springs of the bellows-type for springing. In such pneumatic springs it is common to connect and tighten the beads on both ends of the bellows with the fastening surface by means of safety or retaining rings having folds or laps or grooves for locating the rings by means of screws. Though such bellows-type pneumatic springs have a sufficiently long life, they are also considerably stiff. As a rule, they do provide a comfortable ride. If it is desired to improve the quality of springing in such vehicles and to substitute bag-type pneumatic springs for bellows-type pneumatic springs, it is necessary to change the system for fastening pneumatic springs to a greater or lesser degree, and this is costly. At the same time, it is also desirable that the fastening systems be identical, and at least some of the parts of both types of the interchanged pneumatic springs should be in common to increase mass production and to reduce the costs.

When using any of the known types of pneumatic springs, it is necessary to use a compression stop made as a rule from rubber, which limits the compression of the pneumatic spring and prevents damage to the wheels. The stop is often located inside the pneumatic spring and it is then mounted either on the upper fastening surface, or on the upper supporting plate, or on the upper part of the pneumatic spring, and during springing it rests on the front surface of the piston, or on the opposite partition of the supporting bracket, or the stop is reversed on the piston, and it again rests on the opposite part. All this requires additional elements which raise the costs of production. It has therefore already been proposed to provide a rubber rib on the lug or on the wall of the bag, or of the diaphragm, at the place which, during springing, may come into contact with an opposite part. This rib would take over the performance of an elastic stop. But this rib also produces and increases the effect of a sudden change of the shape and cross-section, reducing the life of the bag or of the diaphragm, and complicating the mould for the production.

It is the object of the present invention to provide a pneumatic spring improved over the prior art devices.

It is another object of the present invention to provide a pneumatic spring which is easily fabricated, and which may be inexpensively produced.

It is another object of this present invention to provide a pneumatic spring which has improved and extended life, and which operates under improved conditions, maintaining desired spring action and ratios without leakage or premature damage.

It is still another object to provide a pneumatic spring which is readily interchangeable with existing and conventional springs and pneumatic systems.

The above objects, and others, together with numerous advantages, are fully described and illustrated in the following disclosure.

SUMMARY OF INVENTION

According to the present invention, there is provided a pneumatic spring comprising a flexible tubular body having an enlarged portion, an axially arranged smaller diameter neck, and radially outwardly directed beads, of the same diameter, at each end. A tubular piston surrounds the neck and has an outer diameter smaller than the enlarged body portion. Retaining means are provided at each end, having a groove for receiving and securing the respective beads; the retaining means are adapted to be fastened to respective supports, at least one of which is movable. In this manner, the piston is movable within the body, under varying load conditions, while the beads are securely held and sealed.

Preferably, the tubular body is cylindrical, although it may be slightly oval or conical. The piston is also preferably made of one piece in a unitary construction, with its adjacent retaining ring, although they may be separately made and later glued or vulcanized together.

In accordance with the invention, the piston may be made of resilient material which forms, in-situ, or by itself, a soft and resilient stop member, limiting telescoping of piston into the body.

Other embodiments, features and preferred forms, as well as a full description of the invention, follows.

DESCRIPTION OF DRAWINGS

In the following description, reference is made to the accompanying drawings in which.

In the drawings, like reference numerals are directed to like elements.

DESCRIPTION OF INVENTION

Figure 1:
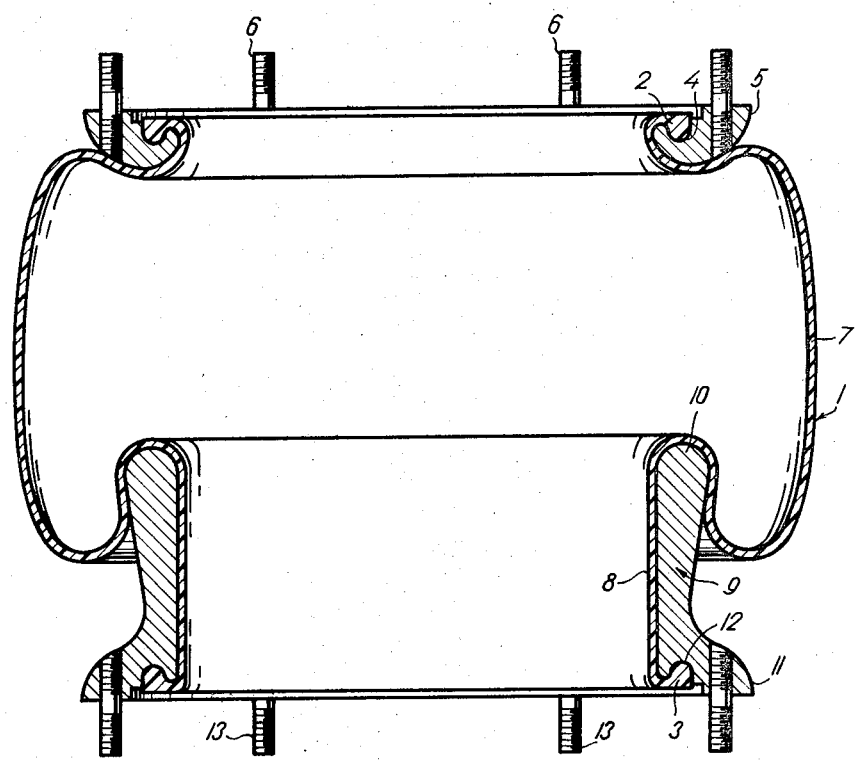
FIG. 1 is an elevational sectional view of a pneumatic spring, embodying the principles of the present invention.

Referring now more particularly to FIG. 1, the pneumatic spring shown is provided with a tubular flexible body 1 made of rubber, synthetic, or similarly resilient material, such as plastic, reinforced in the conventional manner with fabric or metallic cords. The body 1 is provided at both of its open ends with beads 2 and 3 respectively, each equal in diameter and turned or bent radially outward. The upper bead 2 is inserted into the annular groove 4 of a conforming metallic safety or retaining ring 5, which itself is secured by suitable fasteners 6, such as screw or bolts, to a non-illustrated supporting surface. In this manner, the beads 2 and 3 are secured and firmly held between the retaining ring and the support.

The body, which is a bag symmetrical about a central longitudinal axis, has an axially central section 7 of generally circular or oval shape, which is preferably of diametric dimension, greater than the extent of the beads 2 and 3. Secured about a lower terminal neck portion 8 of the body 1 is an annular piston member 9 which, for the purpose of illustration, is shown as a hard material like cast metal or plastic and is of a substantially non-flexible nature when stressed by increasing or decreasing pressure within the body 1. The piston 9 terminates at its upper end in a rounded or beveled edge 10 and at its lower end in a radially outward annular safety or retaining ring 11 similar to the upper ring 5, in that it is provided with an axially outward facing annular groove 12 into which the lower bead 3 is secured. The piston 9 is itself secured by suitable fasteners 12, of the screw or bolt type, to a supporting member which is not illustrated. The inner wall of the annular piston 9 is straight while the outer wall tapers inwardly from the round top 10 and curves in a manner to decrease the narrow diameter and then to increase until the circumference described at the base of the retaining ring 11 is greater than the circumference at the round top 10.

The supporting members for both the upper and lower retaining rings 5 and 10 are preferably similar in nature to those employed in conventional bellows type springs, and may comprise a supporting plate separable from or integral with the chassis, superstructure or axle of the vehicle, a bowl or surrounding housing member provided with an annular securing flange. In any event, the supporting member is provided with means for sealing the ends of the body to make it air tight, and at least, at one end to provide means for introducing compressed air from a suitable source into the interior of the body 1. Preferably, the lower bead or the supporting for it are secured to the axle of the vehicle and consequently able to move the piston 9 vertically within the body 1. However, it may under certain circumstances be desirable to mount the upper bead on its supporting member simultaneous to a movable member, in which case the body 1 and piston 9 can act in accordion fashion. The details of supporting structure, covering, and protective housings, feeding of compressed air, etc., are all analogous to the conventional bellows spring system to which those skilled in this art may make reference.

Figure 2:
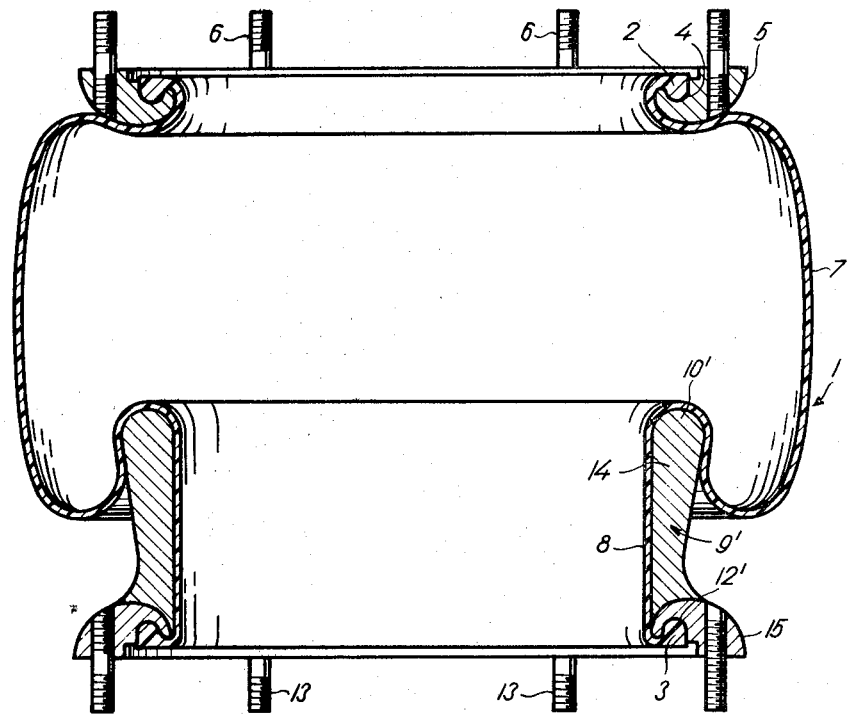
FIG. 2 is a view similar to FIG. 1, showing a modified piston and retaining ring.
Figure 3:
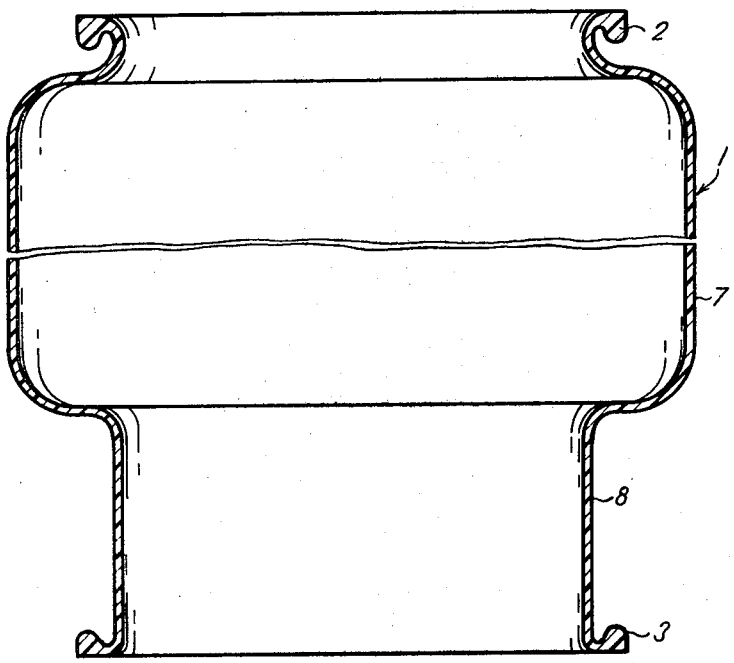
FIG. 3 is a similar view, enlarged, of the body of the spring alone.

FIG. 2 illustrates a pneumatic spring similar to that shown in FIG. 1 and like reference numerals are used for like elements. The difference between the device 11 shown in this figure, however, resides in the fact that the portion 9' forming the retaining ring comprises a separate part 14, which is similar in form and function to the upper retaining ring 5. The remaining portion of the 9' is a substantially cylindrical sleeve having a straight inner wall engaging the end portion of the body and a curved outer wall similar to that shown in FIG. 1. The top 10' of the piston 9' is rounded, while the lower portion is curved to mate with and meet the retaining ring 14, to which it is preferably vulcanized. The retaining ring 14 is provided with a groove 12' adapted to hold the bead 3, as well as screw fasteners 13, as previously described. As in the case of the embodiment shown in FIG. 1, the retaining rings 5 and 14, of FIG. 2 are preferably made of metal, such as steel or aluminum. The piston 9' however is preferably made of hardened rubber or synthetic which is resistant to elasticity caused by increased pressure within the body 1, but does have certain resilient or soft qualities.

Illustrated in FIG. 1 in enlarged detail is a resilient body or bag 1, made of rubber, or synthetic material reinforced with fabric or metallic cords in the known manner, which is intended for use in the assembled devices shown in FIGS. 1 and 2. The central free or radially extensible portion 7 is made of a diameter and length determined by operational factors and spring rate requirements of the device. Thus, it can be of any desired predetermined length and breadth. The body 1 is necked down at its lower end into a terminal portion 8, which is smaller in diameter than the central or extensible portion 7. The axial length of the neck 8 is defined by and conforms with the length of the piston. The beads 2 and 3 are radially turned outward and then axially inward. They, of course, may be reinforced also with metallic rings and loops, and are of a size adapted to be secured with the conforming retaining rings.

Operatively, the pneumatic spring devices are placed in use, as seen in FIGS. 1 and 2, and assume the position shown under normal loading. Compressed air is fed to the interior of the body from the source, which may be a storage accumulator, compressor or similar device. In normal conditions, the piston 9 enters partially into the space of the body 1, delineated by the central or free portions 7 (or 7'), the telescope enabling the piston to telescope or move axially in either direction. If the load on the vehicle is increased, consequently increasing the load on the pneumatic device, the piston 9 (or 9') is pressed axially into the body. The wall of the portion 7 (7') becomes further bent, and depending upon the load, envelopes the round top 10' and moves downwardly against the curved outer wall of the piston 9 (9'). In this manner, the body 1 is actually contracted, decreasing the interior area, and consequently increasing the pressure of the air contained therein. As the pressure increases within the bag or body 1, the axially opposed supporting plate or means (not shown) are resiliently urged apart as in convention compression springs. On occasion, the load may become so great that the piston 9 (9') would telescope completely within the body 1 so that the rounded to 10 (10') would cause abutment against the upper retaining ring 5. In the case of the embodiment shown in FIG. 2, this does not cause concern, since the rubber or synthetic material out of which the piston is made will have sufficient resiliency and softness to avoid damaging the walls of the body 1. To prevent such unwanted damage in the embodiment of FIG. 1, it may be necessary to provide a separate elastic stop or cushion for the hardened piston material.

When the load on the vehicle is reduced, as by the axle suddenly dropping or the vehicle being unloaded of weight, then the piston moves axially outward, tending to straighten the body wall of the central free portion 7 (7'). The air pressure within the piston gradually reduces.

While the inner wall of the piston 9 (9') is shown as being straight axially and cylindrical, and the terminal neck 8 of the body 1 also cylindrical, each may be conformingly modified. For example, they may be shaped to have a slight conical taper, or may have one or more shoulders, steps or grooves to facilitate assembly or operation.

The production of the bag of the pneumatic spring in accordance with the invention is simple and non-exacting. The material of rubber and/or synthetic, and cords for producing the body, can be prepared on a cylindrical mandrel or core, and a simple mould is sufficient for the final shaping and vulcanization of the bag with the bead bent outwards, this mould requiring no heating core and no internal pieces since the final shaping of the body can be accomplished in a similar manner as for bellows of the bellows-type pneumatic springs by means of a compressed inert gas fed into the mould. This insures a very homogeneous and compact wall of uniform thickness. As long as the diameters of both beads are the same, or at least not substantially different, the shape of the material for making the bag need not be excessively changed manually after formation, which also insures a uniform distribution of the cords in the rubber wall of the bag. The uniform thickness of the wall, together with the uniform distribution of the cords, increase the life of the body.

The fact that the wall of the body in the close vicinity of the bead does not become deformed for practical purposes during spring action or telescoping, eliminates harmful effects caused by sudden changes in the shape and cross-section under use, and also contributes to long life.

In comparison with known bag-type pneumatic springs, the pneumatic spring in accordance with the invention consists of a relatively low number of elements which are easy to produce. Due to the fact that one part of the body is inserted into a hollow piston, the base of which forms the safety ring, receiving the bead insures continued and secure sealing. Even if the pistons are cast and are porous to a certain extent, increase of pressure or air volume within the bag will not cause air to leak because tightness is insured by the non-porous nature of neck 8, which is inserted into the hollow piston. Moreover, the air volume in the pneumatic spring, in accordance with the invention, may be further altered, as required, for example, by a suitable shape of the central parts of the fastening surfaces; i.e., space fillers, enlarged members or bosses may be used to reduce the size of this interior cavity.

The pneumatic spring, in accordance with the invention, can be easily designed so that at least the fundamental fastening dimensions of the beads and of the retaining rings are the same as in analogous bellows-type pneumatic springs. Thus it becomes possible to achieve interchangeability of both types of pneumatic springs and to save the costs for the otherwise necessary reconstruction of the vehicles and systems required to mount them. Improvement of the interchangeability of the two types of pneumatic springs increases the possibility of mass production and a further reduction in the costs can be achieved if some of the elements of both types of interchanged pneumatic springs are identical. For example, the retaining ring for connecting the upper bead of the body may be the same, or may also be the lower retaining ring of the embodiment seen in FIG. 2. A hollow piston made in the manner of the present is convenient also from the point of view of production, particularly in case the outer curved diameter of the piston, since it is easier to form the moulds of the various parts in sand, or to withdraw the cast pieces from the moulds. If the cylindrical part of the piston or at least its top consists of rubber, a separate rubber stop and its securing elements are not required, and this leads to a further increase in the production economy of rubber springs, and hence also of vehicles.

Although the above described examples of pneumatic springs in accordance with the invention have been discussed in connection with vehicle springing, it is obvious that the advantages of the solution in accordance with this invention may be used whenever pneumatic springs are usually employed, for example, for springing the bases of machines, and in other similar cases. Various modifications may be made to the shape, size, and form of the body as well as the piston. It is therefore intended that the preceding description is illustrative only, and should not be taken as limiting the present invention in any manner.

What is claimed is:

1. A pneumatic spring comprising a flexible tubular body having an enlarged portion, an axially arranged tubular neck portion of smaller diameter and radially outwardly directed beads at each end having a larger diameter than said tubular neck portion, an elongated tubular piston surrounding the neck and having an outer diameter smaller than the enlarged portion, said piston comprising a hollow tubular sleeve having a cylindrical inner surface and a curved outer surface, said outer surface having a rounded top edge and tapering inwardly along its length to a predetermined point and then outwardly to a bottom edge, the bottom edge having a diameter greater than the diameter of the top edge and having a groove for receiving one of the beads of said body, retaining means at each end of said body for securing the respective beads, said retaining means being adapted to be fastened to respective supports, at least one of which is axially movable, to thereby cause said piston to be telescopingly movable within the body, said body rolling along the outer surface of said piston under varying load conditions applied to said supports.

2. The spring according to claim 1 wherein said body comprises an open ended bag symmetrical about a central longitudinal axis.

3. The spring according to claim 2, wherein said body is substantially cylindrical.

4. The spring according to claim 1 wherein said piston and the adjacent retaining ring are unitarily formed as one piece.

5. The spring according to claim 1 wherein said piston and the adjacent retaining ring are separately formed.

6. The spring according to claim 1, wherein said piston is formed of resilient material and provides at its upper edge a stop adapted to abut, under excessive loads, with the interior of the body.

* * * * *